United States Patent [19]
Levin

[11] 3,927,642
[45] Dec. 23, 1975

[54] PROCESS AND APPARATUS FOR GASSING BROODING EGGS

[76] Inventor: Gerd Levin, Ernst-August Str. 13A, 2 Hamburg 54, Germany

[22] Filed: June 17, 1974

[21] Appl. No.: 479,778

[52] U.S. Cl. .................. 119/1; 119/160; 119/37
[51] Int. Cl.² ........................................ A01K 49/00
[58] Field of Search ............ 119/1, 160, 37, 35; 128/185; 424/334; 21/58

[56] References Cited
UNITED STATES PATENTS

| | | | |
|---|---|---|---|
| 885,233 | 4/1908 | Eichengrun | 424/334 |
| 2,984,240 | 5/1961 | Eames | 128/185 |
| 2,993,832 | 7/1961 | Kaitz | 21/58 X |

Primary Examiner—Hugh R. Chamblee
Attorney, Agent, or Firm—H. Dale Palmatier; James R. Haller

[57] ABSTRACT

Method and apparatus for gassing eggs in a gassing cabinet by heating and evaporating crystaline formaldehyde and water into heated air in a chamber adjoining the gassing cabinet, preheating the gassing cabinet, introducing the eggs into the preheated cabinet, circulating the evaporated gases and air into and through the gassing cabinet with a fan and through the chamber again at a closely defined temperature and humidity condition, and by automatic valves in the chamber withdrawing the gas mixture from the gassing cabinet.

7 Claims, 3 Drawing Figures

PROCESS AND APPARATUS FOR GASSING BROODING EGGS

BACKGROUND OF THE INVENTION

The invention refers to a process and an apparatus for gassing brooding eggs by means of formaldehyde in a gassing cabinet.

In poultry raising it is a matter of importance that eggs to be used as brooding eggs be treated prior to brooding in such a way as to prevent harmful germs from entering the egg or to kill any germs that may be already present in the inside of the egg. When the egg is placed in the brooder it should be as free of germs as possible. It is especially advantageous to keep the eggs germ free or to de-germ them by means of gassing when they are freshly laid, since in this state the pores are still open, thus maximizing the effect of the germicidal gas.

A wide variety of processes and apparatus for gassing brooding eggs is known. For example, gassing cabinets are known into which a heatable pan is introduced after the eggs have been placed there. In this cabinet, 20 to 35 ml of formalin per cubic meter of interior space are evaporated with the aid of 17.5 to 25 g of potassium permanganate. The gas thus generated has an effective penetration time of 30 to 120 minutes. Even though the amount of formalin used in this familiar process is quite high, the germicidal effect is, in practice, not as great as could be desired. Also, the results obtained by pan-gassing cannot always be repeated, since various influential factors cannot be taken into consideration. In addition, practical problems arise with regard to the distribution of the gas as well as the control of temperature and moisture. It is likewise difficult to eliminate human error.

SUMMARY OF THE INVENTION

It is the aim of the invention to create a process and an apparatus of the initially specified kind, by means of which the brooding eggs can be de-germed with greater assurance and with a higher level of effectiveness.

Using a process of the initially specified kind, this task is accomplished by means of the following steps in the process:
  a. warming the gassing cabinet;
  b. placing the brooding eggs to be gassed in the cabinet;
  c. evaporating the appropriate amounts of crystalline formaldehyde and water;
  d. rotating the gas mixture in the gassing cabinet containing the brooding eggs; and
  e. ventilation of the gassing cabinet.

To carry out the process according to the invention it is advantageous to use an apparatus which provides a gas generating apparatus which is located on the gassing cabinet as a separate unit, but which is connected with the gassing cabinet. The gas generating apparatus contains two chambers, each of which is connected via an opening with the interior space of the gassing cabinet, and both of which are interconnected via a ventilator, whose direction of rotation can be reversed, whereby there is located in one of the chambers an evaporator for the crystalline formaldehyde and the water as well as an electric heater, and whereby the other chamber is connected with an outlet vent or the like by means of an opening provided with a damper.

An advantageous way to carry out the process according to the invention is to warm the gassing cabinet to a temperature between 18° and 25°C, and to maintain a relative humidity of over 70 percent during gassing, and to evaporate 6 to 10 g of crystalline formaldehyde and approximately 20 ml of water per cubic meter of interior space and to allow approximately 30 minutes for the penetrating effect on the brooding eggs.

In contrast to the processes representing the present state of technology, the process according to the invention operates with a gas formed from a certain, relatively small amount of crystalline formaldehyde and water, whereby the air and gas humidity is always kept relatively high. The amount of crystalline formaldehyde used per cubic meter of interior space in the gassing cabinet is much less than that used at the present state of technology, whereby, however, the results attained are at least as good as those attained according to the present state of technology. This is to be attributed to the conduct of the process as indicated in claim 1 and to the design of the gas generating aggregate as a separate unit (no pan-gassing).

DESCRIPTION OF THE DRAWINGS

In the following, additional advantages and details of the invention are explained in greater detail with reference to the drawing which represents a sample version of the invention.

DETAILED DESCRIPTION OF THE INVENTION

Figure 1:
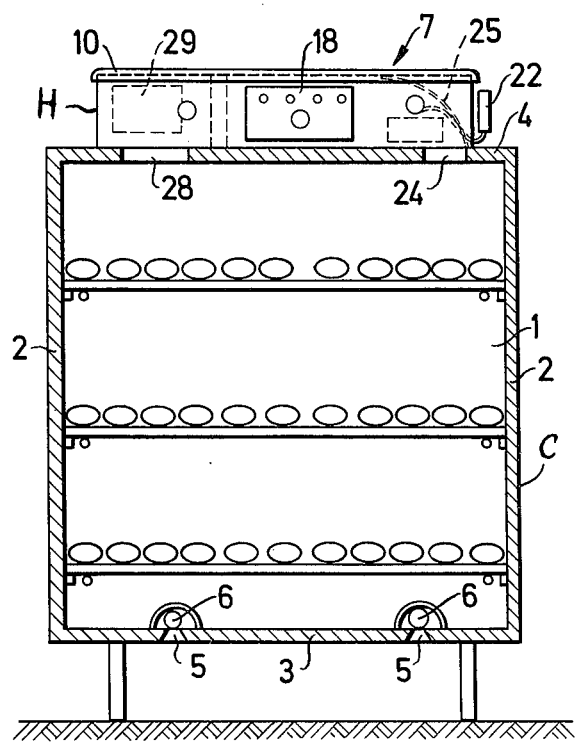
FIG. 1 shows a longitudinal section of an apparatus for carrying out the process according to the invention.
Figure 2:
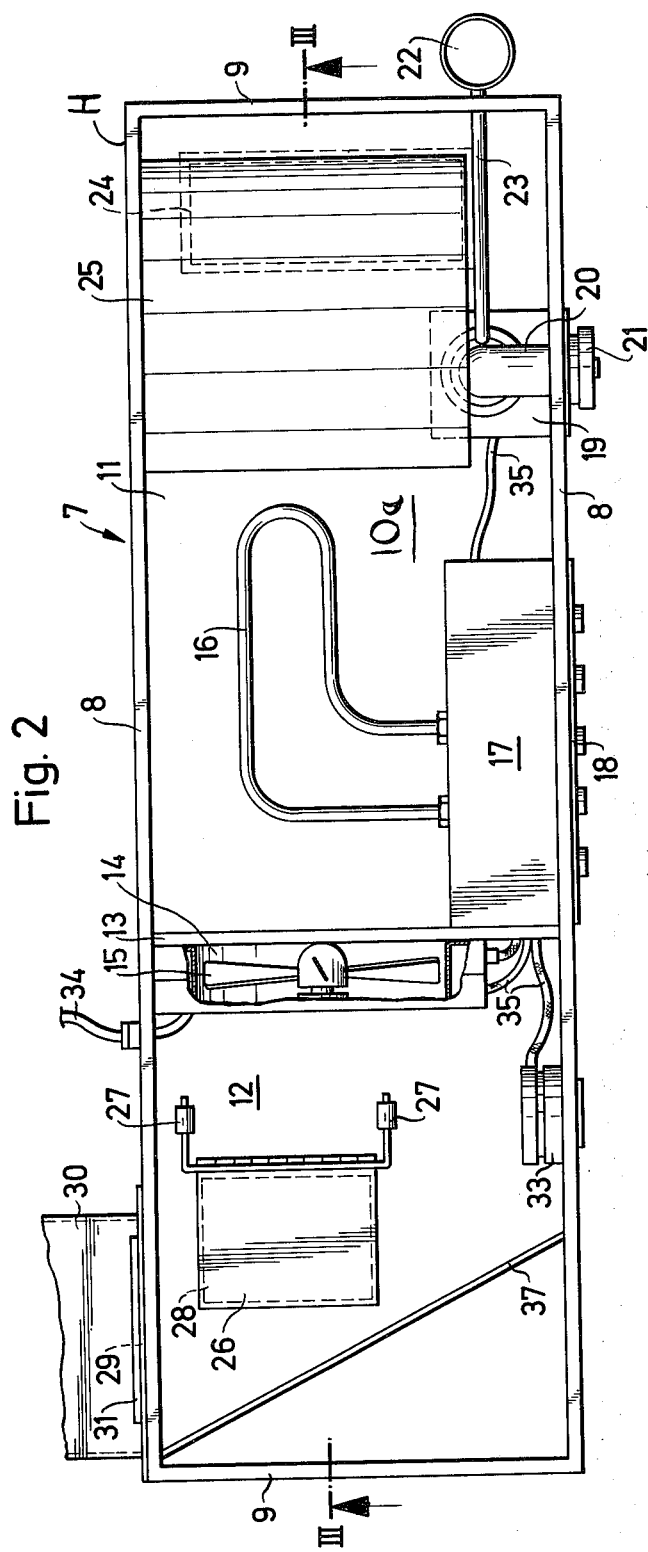
FIG. 2 shows a top plan of the gas generating aggregate of the apparatus according to FIG. 1, with the cover or top wall removed.

The apparatus shown in the drawing consists of a gassing cabinet C comprised of insulated walls 2, 3 and 4 with suitable access doors, and of the gas generating apparatus 7 located on this gassing cabinet. In the interior space 1 of this gassing cabinet are located transverse shelves to accommodate the eggs. In floor 3 of the gassing cabinet ball valves 6 are provided with open ports 5 when low pressure is generated in the gassing cabinet.

Gas generating apparatus 7 consists of a housing H with side, end and top walls 8, 9 and 10, and a bottom wall 10a. The housing H is divided into two chambers 11 and 12 by means of a transverse wall 13. Transverse wall 13 is provided with an opening 14, in which is mounted a ventilator 15 whose direction of rotation can be reversed.

In chamber 11 there is a heating coil 16 which is electrically heated from a control apparatus 17. A panel 18 on the outside of wall 8 is equipped with an operation knob and various control lamps.

Between heating coil 16 and an opening 24 in bottom wall 10a and in top wall 4 of cabinet C which leads into the interior space 1 of the gassing cabinet C there is located an evaporator 19 which is comprised of a pot which can be electrically heated. A curved pipe 20 protrudes through wall 8 providing an opening for introducing the crystalline formaldehyde into the interior of the pot, and pipe 20 can be closed by means of a cover 21. A container 22 for the water to be evaporated is provided on the exterior of wall 9. This container 22 is connected via a pipe 23 with the interior space of the evaporator pot 19. The interior of evaporator pot 19 communicates freely with the chamber 11 for freely transferring evaporated gasses into the air circulating through chamber 11. A curved guide-foil 25 guides the air flowing from fan 15 over heating coil 16 and evaporator 19 to opening 24 for delivery to the gassing cabinet.

Figure 3:
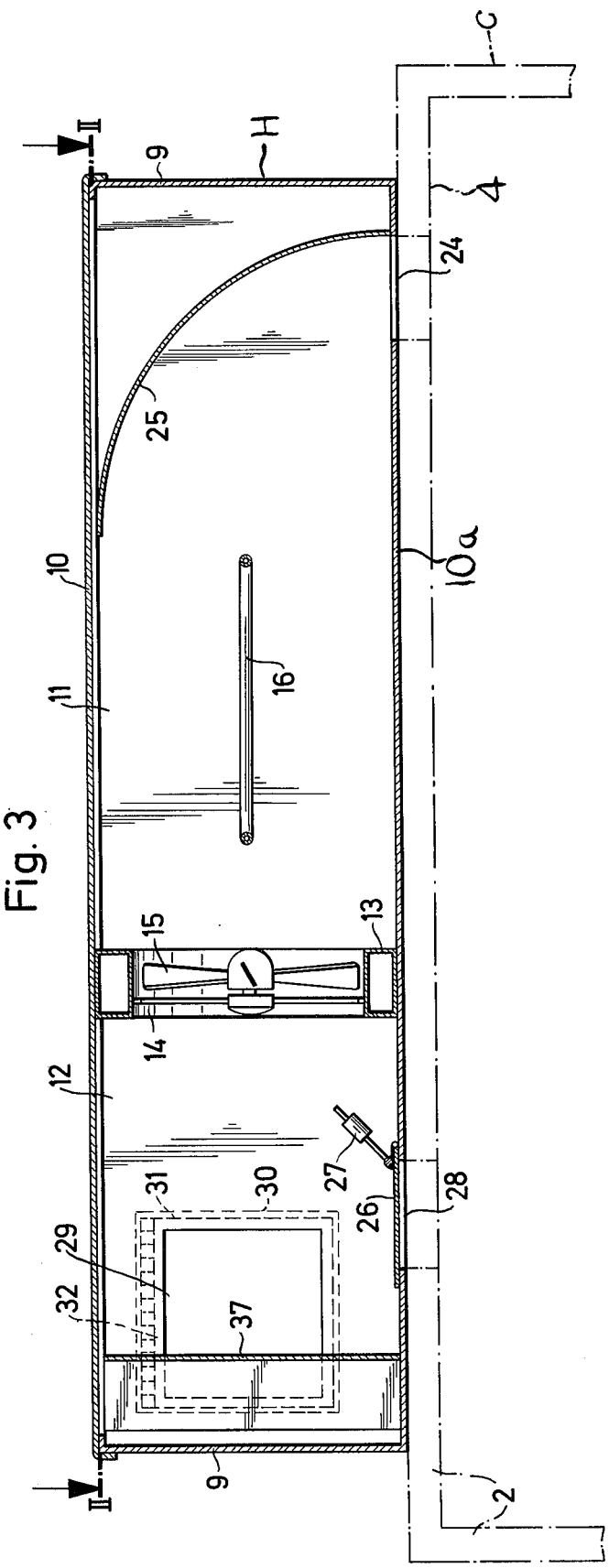
FIG. 3 shows a longitudinal section through the housing of a gas generating aggregate according to FIG. 2.

The other chamber 12 is likewise connected with the interior space 1 of the gassing cabinet C via an opening 28. This opening can be closed by means of a swingably mounted damper 26. The opening motion of the damper can be influenced by means of weights 27. In the rear wall 8 an additional opening 29 is provided in the area of chamber 12, which opening can be closed by means of hinged damper 31. This opening 29 provides the connection with an outlet vent 30. Damper 31 can be swung on a hinge 32 (FIG. 3). In addition, a thermostat 33 and a guide panel 37 are located in chamber 12.

An electrical input conduit 34 supplies power into cabinet H and electrical lines 35 in chambers 11 and 12 supply power and control signals to the fan, thermostat and evaporator.

In a practical operation, 3,240 brooding eggs were gassed in the cabinet shown in a space of 1.25 cubic meters. For this gassing, 8 g of crystalline formaldehyde and 20 ml of water were introduced per cubic meter of interior space. In this way a germicidal effect of 96.9 percent was achieved. During the gassing the temperature was held constant between 20° and 24°C by means of the thermostats. The relative humidity was 75 percent.

Now, if gassing is to be carried out with the apparatus herein described and illustrated, the gassing cabinet C, i.e., all walls and transverse shelves are heated to the desired temperature, approximately 22° C. At this time the colder eggs are placed inside and the cabinet is closed. Then 8 g of crystalline formaldehyde and 20 ml of water are introduced into the pot of evaporator 19, i.e., into container 22, per cubic meter of interior space. The direction of rotation of fan 15 is so adjusted that air is sucked into the cabinet through opening 28. In accord with the suction effect, damper 26 is in open position. Damper 31 is closed. If required, the air being sucked in is heated by heating coil 16 and enriched with gas in the area of evaporator 19. This gas mixture enters the gassing cabinet C via opening 24. Since the brooding eggs are usually somewhat colder than the other components in the gassing cabinet, the gas tends to precipitate onto the eggs, thus improving the degree of effectiveness. When after ca. 30 minutes the gassing has concluded, the direction of rotation of the fan is reversed. The gas is now sucked from the interior space 1 of the gassing cabinet C through opening 24 and forced through outlet vent 30, whereby damper 26 is closed and damper 31 is opened. Fresh air flows in through openings 5 in the floor 3 of the gassing cabinet, since ball valves 6 were opened in response to the low pressure in the gassing cabinet. Upon conclusion of the exhaust phase, the eggs can be removed to make room for another batch of eggs to be gassed.

According to the invention, various factors work together to assure favorable gassing, i.e., a high degree of germicide with a favorable level of efficiency. Among these are: the amounts of crystalline formaldehyde and water used, the relative humidity of at least 70 percent and the structural design of the apparatus, especially the separation of the gassing cabinet and the gas generating aggregator which is located on the gassing cabinet and connected with the interior space of the gassing cabinet by means of corresponding openings.

What is claimed is:

1. A process for freshly laid gassing brooding eggs in a gassing cabinet by means of formaldehyde, consisting in the following procedural steps:
    a. heating the gassing cabinet,
    b. introducing the freshly laid brooding eggs to be gassed,
    c. evaporating crystalline formaldehyde and water into air,
    d. circulating the gas mixture in the gassing cabinet containing the brooding eggs, and
    e. removing the gas mixture from the gassing cabinet.

2. The process according to claim 1 wherein the gassing cabinet is initially heated to a temperature between 18° and 25°C, and the relative humidity held in excess of 70 percent during the gassing, and wherein 6 to 10 g of crystalline formaldehyde and ca. 20 ml of water are evaporated per cubic meter of interior space, and further that the gas mixture is circulated for approximately 30 minutes to allow the gas to act on the eggs.

3. The process according to claim 2 wherein 8 g of crystalline formaldehyde are converted into gas.

4. An apparatus for gassing brooding eggs with formaldehyde, comprising:
    a gassing cabinet to receive and contain the brooding eggs to be gassed;
    a gas generating apparatus including a housing upon the top of said cabinet, the housing having first and second chambers, said cabinet and housing having a pair of openings each communicating between a respective chamber and the gassing cabinet for permitting flow of gas between the chambers of the housing and the cabinet,
    the gas generating apparatus including heated container means in said first chamber for evaporating crystalline formaldehyde and water into air and heating the gas mixture, and also including a fan between the chambers of the housing for circulating the gas mixture into the gassing cabinet during gassing of the brooding eggs.

5. The apparatus according to claim 4 wherein the fan is reversible, the second chamber of the housing having an outlet vent to the exterior of the housing and including an opening which is provided with a damper.

6. The apparatus according to claim 5 wherein one of the openings between the chamber and the gassing cabinet has a damper which can be rotated into open position when the fan rotates in reverse direction, and wherein the gassing cabinet has air intake ports with ball valves preventing escape of gas under pressure from the gassing cabinet into the atmosphere.

7. An apparatus according to claim 5 wherein a curved plate is located in the housing and between the evaporator and the delivery opening which leads from the chamber containing said evaporator into the gassing cabinet.

* * * * *